United States Patent [19]

Komurasaki et al.

[11] 4,253,734
[45] Mar. 3, 1981

[54] ELECTRO OPTICAL MODULATION SYSTEM

[75] Inventors: Satoshi Komurasaki; Isao Watanabe, both of Amagasaki, Japan

[73] Assignee: Mitsubishi Denki Kabushiki Kaisha, Tokyo, Japan

[21] Appl. No.: 87,042

[22] Filed: Oct. 22, 1979

[51] Int. Cl.³ .................................. G02F 1/03
[52] U.S. Cl. .................... 350/386; 350/356
[58] Field of Search ........... 350/150, 356; 332/37 D; 445/611

[56] References Cited

U.S. PATENT DOCUMENTS 3,409,376 11/1968 French et al. .................. 350/150
3,675,022 4/1972 Nelson et al. .................. 350/150

Primary Examiner—Richard Rosenberger
Attorney, Agent, or Firm—Oblon, Fisher, Spivak, McClelland & Maier

[57] ABSTRACT

An electro optical modulation system utilizes electro optical effect of a crystal. The electro optical modulation system comprises a voltage comparator for comparing a modulated light intensity signal with a reference voltage; and a bias controlling device which feeds a differential signal between mean value signal of the output of the voltage comparator and mean value signal of the inverted output of the voltage comparator, to an optical modulator as a bias voltage.

2 Claims, 6 Drawing Figures

ELECTRO OPTICAL MODULATION SYSTEM

BACKGROUND OF THE INVENTION

1. Field of the Invention

The present invention relates to an electro optical modulation system utilizing electro optical effect.

2. Description of the Prior Arts

Recently, modulated light signals obtained by modulating beams such as laser beams by high frequency signals have been often used as recordings for video discs or pulse code modulation audio discs etc.

The optical modulator for modulating the beam by the high frequency signal can be an optical modulator using electro optical effect (hereinafter referring to as EO type optical modulator) and an optical modulator using supersonic optical deflection (hereinafter referring to as AO type optical modulator).

The EO type optical modulator can be used in wideband range and has high power resistance however it has disadvantages of large drift and difficulty in its operation. On the other hand, the AO type optical modulator has small drift and is easily operated, however it has disadvantages of narrowband range and inferior power resistance.

In general, it is indispensable to be wideband range for recording data in superdensity for a video disc, etc. Thus, the EO type optical modulators have been mainly used though the drift is large and the complicated operation is required.

In the conventional electro optical modulation system using the EO type optical modulator, a differential signal between a reference signal for the normal bias level and a comparison signal for a modulated condition is formed by a differential amplifier and is fed through a bias amplifier to the optical modulator, thereby controlling drift of a bias point caused by variation of the temperature, etc.

Thus, in the conventional system, it is necessary to equip splitters and optical detectors respectively at the inlet and outlet of the optical modulator, and the cost of the system is remarkably expensive and moreover, arrangement of optical axis of the optical modulator and axes of these parts is complicated. These are seriously disadvantages.

SUMMARY OF THE INVENTION

It is an object of the present invention to provide an electro optical modulation system which performs bias control of an optical modulator by only one optical detector system.

The foregoing and other objects of the present invention have been attained by providing an electro optical modulation system which comprises a voltage comparator for comparing a modulated light intensity signal as an output of an optical modulator with a reference voltage so as to output two voltage signals; an inversion circuit for inverting the output of said voltage comparator; a first mean value circuit for the mean value of the output of said voltage comparator; a second mean value circuit for the mean value of the output of said inversion circuit; a differential amplifier for receiving the outputs of said first and second mean value circuits respectively as the first and second inputs; and a bias amplifier for feeding the output of said differential amplifier into said optical modulator.

DETAIL DESCRIPTION OF THE PREFERRED EMBODIMENTS

Figure 1:
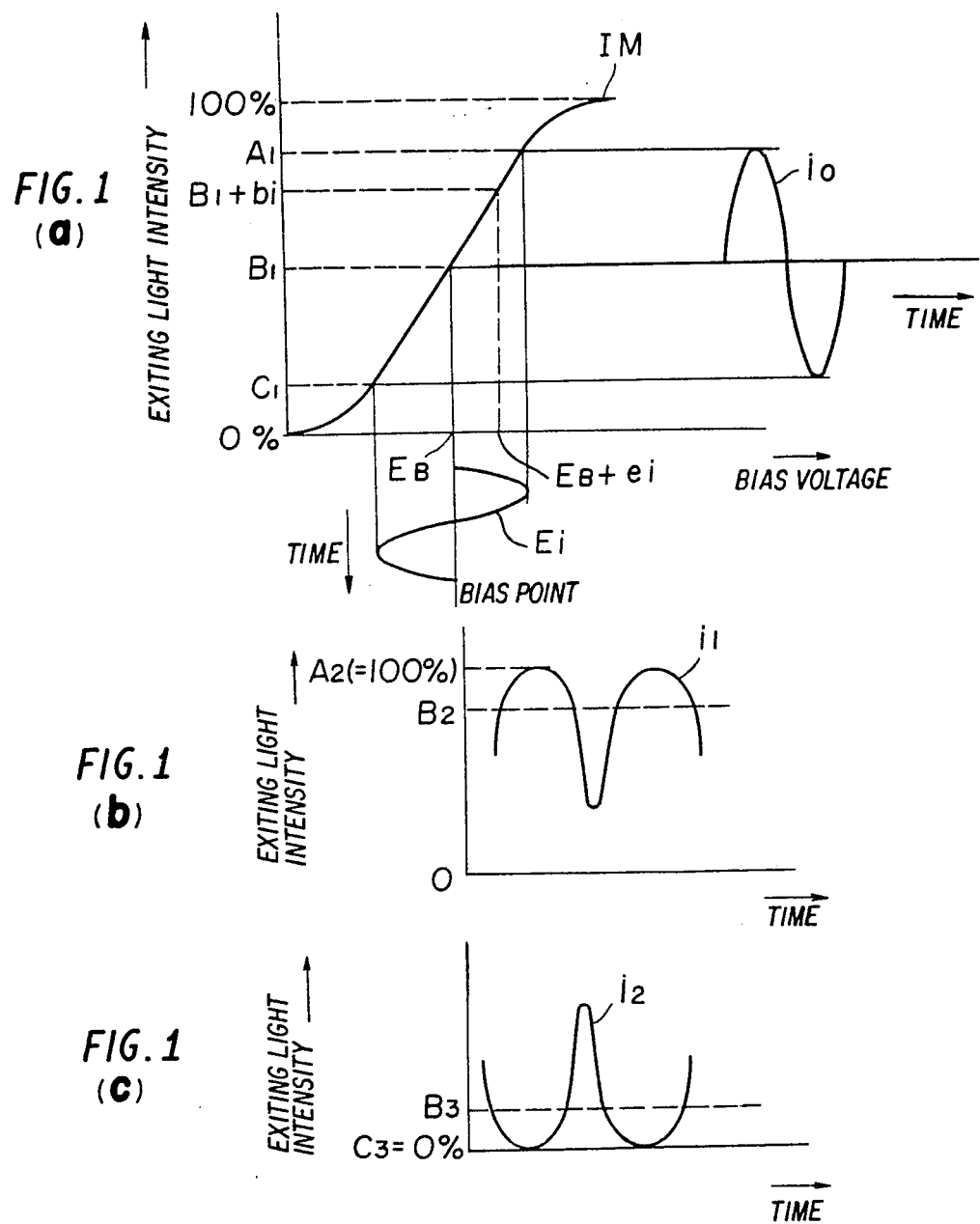
FIG. 1(a) is a diagram showing modulation characteristic of an optical modulator using electro optical effect; modulated signal in normal bias; and waveform of modulated light intensity signal.
FIGS. 1(b) and (c) are respectively diagrams showing each waveform of the modulated light intensity signal in each condition drifting bias point to upper or lower side from the normal bias point.

The conventional electro optical modulation system will be illustrated so as to understand the present invention.

The fundamental structure and the principal of operation of the conventional EO type optical modulator using electro optical effect of a crystal are described in detail in Laser Handbook (Asakura Shoten). The conventional EO type optical modulator will be illustrated referring to the drawings.

FIG. 1(a) is a diagram showing the modulation characteristic of the conventional EO type optical modulator wherein the exiting light intensity is plotted on the ordinate and the bias voltage is plotted on the obscissa. The signal waveform shown at right side shows the waveform of modulated light intensity signal $i_0$ in the normal modulation by modulated signal $E_i$; FIG. 1(b) shows the waveform of the modulated light intensity signal $i_1$ in the condition drifting the bias point to upper side; FIG. 1(c) shows the waveform of the modulated light intensity signal $i_2$ in the condition drifting the bias point to lower side.

In FIG. 1(a), the exiting light intensity to the bias voltage $E_b$ is given as $B_1$ and the exiting light intensity to the applied voltage $(E_b + e_i)$ is given as $B_1 + b_i$. Thus, when sine wave modulated signal $E_i$ is superposed to the bias voltage $E_b$, the exiting light intensity is varied between $A_1$ and $C_1$ and the modulated light intensity signal $i_0$ is obtained. The modulation characteristic IM of the EO type optical modulator has sine square characteristic and accordingly, the waveform of the modulated light intensity signal i is distorted by drifting the bias point $E_b$.

For example, the waveform of the modulated light intensity signal $i_1$ in the condition drifting the bias point $E_b$ to the upper side is distorted as shown in FIG. 1(b) whereas that in the condition drifting the bias point $E_b$ to the lower side is distorted as shown in FIG. 1(c). Thus, the mean value of the modulated light intensity signal i is $B_1$ in the case of FIG. 1(a); $B_2(>B_1)$ in the case of FIG. 1(b); and $B_3(<B_1)$ in the case of FIG. 1(c). The mean value of the modulated light intensity signal i is varied depending upon the bias voltage. The mean value $B_1$ is 50% of the maximum exiting light intensity when 100% modulation is carried out in the normal bias i.e. the modulation for $A_1 = 100\%$ and $C_1 = 0\%$ in FIG. 1(a).

The above-mentioned characteristic is utilized in the conventional bias regulator.

Figure 2:
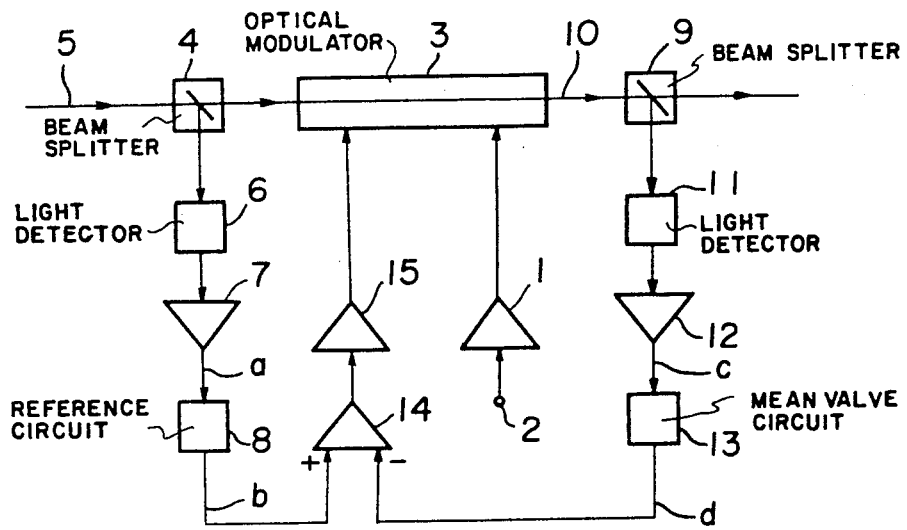
FIG. 2 is a block diagram of one embodiment of the conventional electro optical modulation system.

Referring to FIG. 2, the conventional electro optical modulation system having the conventional bias regulator will be illustrated.

FIG. 2 is a block diagram of the conventional EO type optical modulator. In FIG. 2, the reference numeral (1) designates a modulation amplifier for feeding the modulated signal from input terminal (2) to the EO type optical modulator (3); (4) designates an entering beam splitter for sampling a part of light (5) entering into the optical modulator (3); (6) designates a light entering detector which detects the light (5) entering from the entering beam splitter (4) so as to convert it to electric signal; (7) designates an imput amplifier for amplifying an output signal of the light entering detector (6); (8) designates a reference circuit which outputs a signal b having ½ level of the input signal by receiving the output a of the input amplifier (7); (9) designates an exiting beam splitter for sampling a part of light (10) exiting from the optical modulator (3); (11) designates a light exiting detector which detects the light (10) exiting from the exiting beam splitter (9) and converts it into an electric signal; (12) designates an output amplifier for amplifying the output signal of the light exiting detector (11); (13) designates a mean value circuit for feeding the signal d having mean value level of the output c of the output amplifier (12); (14) designates a differential amplifier which inputs the output b of the reference circuit (8) and the output d of the mean value circuit (13); (15) designates a bias amplifier which amplifies the output of the differential amplifier (14) so as to feed it to the modulator (3) as the bias voltage. The circuit is formed by direct current connections.

The operation of this circuit will be illustrated.

The entering light (5) is split by the entering beam splitter (4) and a part of the light is fed into the light entering detector (6) and most of the light is fed into the optical modulator (3). The entering light (5) is modulated in the optical modulator (3) so as to form the exiting light (10). The exiting light (10) is split by the exiting beam splitter (9) and a part of the light is fed into the light exiting detector (11) and most of the exiting light (10) exits from the electro optical modulation system.

The light entering detector (6) detects the entering light (5) to converts it into the electric signal. The electric signal is fed into the input amplifier (7). The input amplifier (7) amplifies the input signal and feeds the output a to the reference circuit (8) which outputs the signal b having ½ level of the input signal a into one input of the differential amplifier (14). On the other hand, the light exiting detector (11) detects the exiting light (10) to convert it into the electric signal. The electric signal is fed into the output amplifier (12). The output amplifier (12) amplifies the input signal and feeds the output c into the mean value circuit (13). The exiting light (10) is a high frequency signal which is modulated during the pass of the optical modulator (3). The mean value circuit (13) outputs the signal d having the mean value level of the high frequency signal. The output signal d is fed into the other input of the differential amplifier (14).

The differential amplifier (14) amplifies the differential signal between the output signal b of the reference circuit and the output signal d of the mean value circuit (13) and the amplified signal is fed into the bias amplifier (15) which amplifies the output signal of the differential amplifier (14) to a desired level and feeds the bias voltage to the optical modulator (3).

The modulated signal is fed to the input terminal (2) and is amplified by the modulation amplifier (1) and the amplified signal is fed into the optical modulator (3). There is no loss of the entering light (5) in the optical modulator (3). Thus, the modulation is the 100% modulation for $A_1 = 100\%$ and $C_1 = 0\%$ in FIG. 1($a$).

The optical modulator (3) modulates depending upon the modulated signal fed from the input terminal (2) at the bias point corresponding to the differential signal of the output of the differential amplifier (14), whereby the entering light (5) is modulated by high frequency modulation to give the exiting light (10).

When the normal bias is fed as shown in FIG. 1($a$), the mean value level $B_1$ of the modulated light intensity signal is ½ of the maximum exiting light intensity. This is shown in FIG. 1($a$) as $A_1 = 100\%$ and $C_1 = 0\%$. The bias control is based on this principle.

The signal level of the output a of the input amplifier (7) shows the intensity of the entering light (5). The signal level of the output b of the reference circuit (8) is ½ of the signal level of the output a and corresponds to the mean value level of the modulated light signal in the normal bias. The signal level of the output b is the reference for the bias control.

On the other hand, the output signal c of the output amplifier (12) is the high frequency signal obtained by detecting the exiting light (10). The mean value level of the high frequency signal is detected by the mean value circuit (13). The output signal d of the mean value circuit (13) is the signal for the mean value. The mean value level in the case of no bias control is $B_2$ or $B_3$ in FIG. 1($b$) and ($c$). The output signal d of the mean value circuit (13) is the comparison signal to the reference signal b as the output of the reference circuit (8).

The differential signal between the reference signal b for showing the normal bias level and the comparison signal d for showing the modulated condition is formed by the differential amplifier (14) and the differential signal is fed through the bias amplifier (15) into the optical modulator (3) whereby the drift of the bias point caused by variation of the temperature etc. can be controlled. As a result, a stable modulated light signal can be always given.

However, in the conventional system, it is necessary to equip each beam splitter and each optical detector at the light inlet and the light outlet of the optical modulator (3). Therefore, the expensive parts are required to cause high cost; and the arrangement of the optical axis of the optical modulator and the axes of these parts is not easily attained to require complicated operations. These disadvantages are found.

The present invention is to overcome these disadvantages in the conventional system, and is to provide an electro optical modulation system which requires only one beam splitter or one optical detector.

Referring to the drawings, one embodiment of the present invention will be illustrated.

Figure 3:
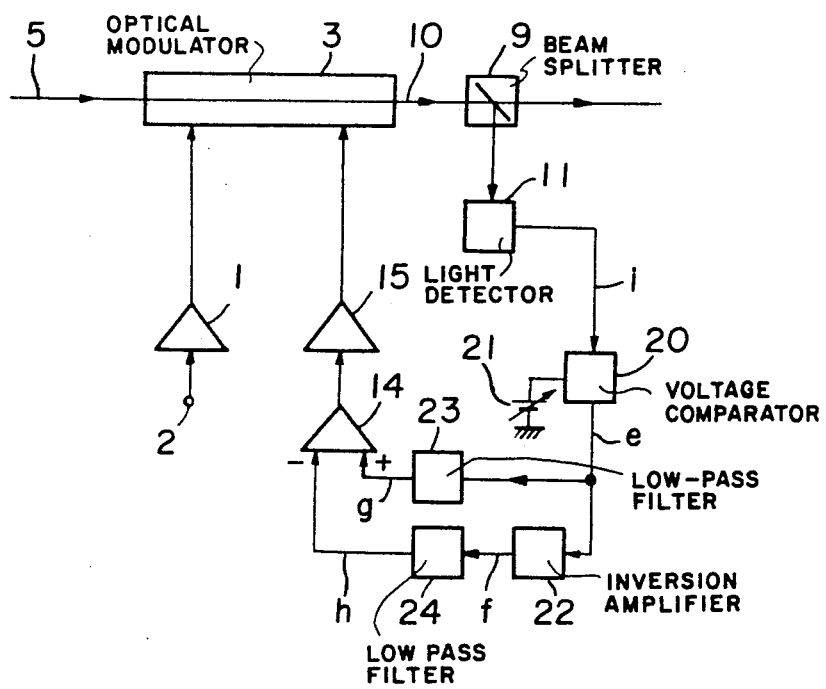
FIG. 3 is a block diagram of one embodiment of the electro optical modulation system of the present invention.

FIG. 3 is a block diagram of one embodiment of the electro optical modulation system of the present invention. In FIG. 3, the same references designate the corresponding or similar parts shown in FIG. 2. The reference numeral (20) designates a voltage comparator which compares the modulated light intensity signal i as the output of the light exiting detector (11) with the reference voltage B of a reference power source (21) to form the voltage output e; (22) designates an inversion amplifier as an inversion circuit for inverting the output e of the voltage comparator (20); (23) designates a first low-pass filter as a first mean value circuit for mean value of the output e of the voltage comparator (20); (24) designates a second low-pass filter as a second mean value circuit for mean value of the output f of the inversion amplifier (22). The outputs g and h of the first and second low-pass filters (23), (24) are respectively fed into the first and second inputs. In this circuit, the circuit below the voltage comparator (20) is the alternating current connections.

Figure 4:
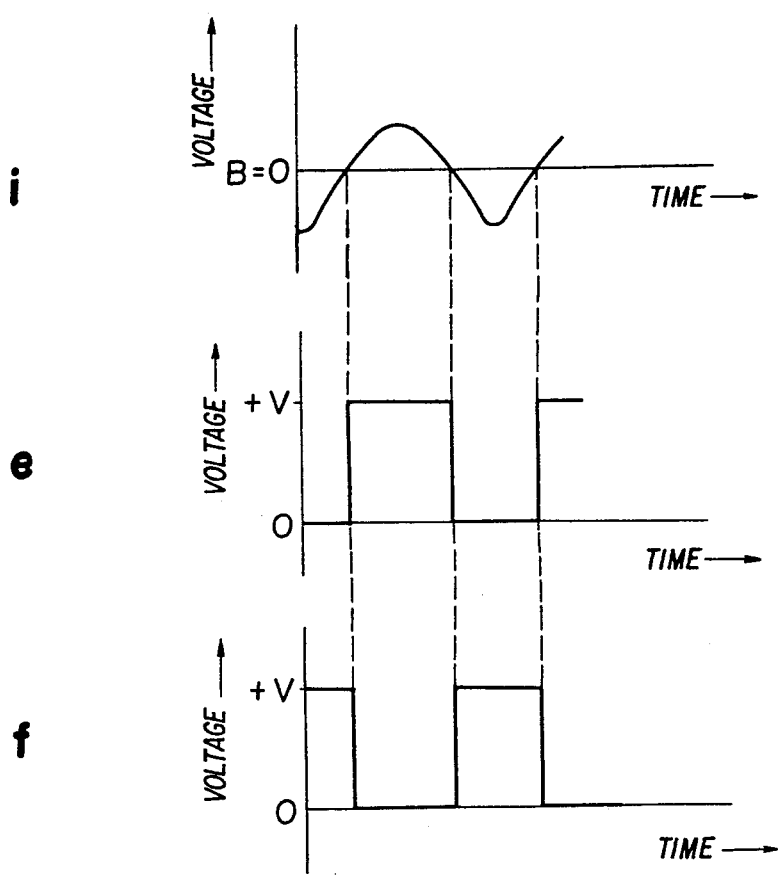
FIG. 4 shows signal waveforms at certain parts in the circuit of FIG. 3.

The operation of this circuit will be illustrated in detail referring to signal waveforms at certain parts shown in FIG. 4.

The modulated light intensity signal i obtained by converting the modulated light signal into the electric signal by the light exiting detector (11) is input into the voltage comparator (20). The voltage comparator (20) outputs the voltage signal e shown in FIG. 4 depending upon the condition that the input signal i is higher or lower than the reference voltage B(B=0) of the reference power source (21). The output signal e is inverted by the inversion amplifier (22) to give the voltage signal f shown in FIG. 4. The voltage signals e and f are respectively passed through the first or second low-pass filter (23),(24) to give mean values and the mean value signals g and h are fed into the differential amplifier (14). The differential amplifier (14) forms the differential signal between the signals g and h and the differential signal is fed through the bias amplifier (15) to the optical modulator (3).

In the normal bias, the ouput e of the voltage comparator (20) for comparing the modulated light intensity signal i with the reference voltage B is the pulse signal having a duty ratio of 50% as shown in FIG. 4. The inversion signal f for the output e is also the pulse signal having a duty ratio of 50% in inversion phase. Thus, the mean value signals g and h obtained by passing respectively the signals e and f through each low-pass filter (23),(24) are the signals having the same levels. The output of the differential amplifier (14) is zero and the bias point is not drifted and the modulation is carried out in the normal bias.

However, when the bias point is drifted by variation of the temperature etc., the modulated light intensity signal i is varied as the signals shown in FIGS. 1(b), or (c). The duty ratio of the output e of the voltage comparator (20) is shifted from 50% and the direction of the shifting corresponds to the drifting direction of the bias point. The duty ratio of the ouput f as the inversion signal of the output e is shifted to the opposite direction to that of the output e. Therefore, the mean value signals g and h for the signals e and f are not equal whereby the output signal whose polarity corresponds to either direction of the duty ratio and whose signal level corresponds to the degree of the shift is given as the output of the differential amplifier (14). Thus, the bias of the optical modulator is controlled so as to give the duty ratio of 50% in the reference voltage level of the modulated light intensity signal by feeding the output signal through the bias amplifier (15) into the optical modulator (3). The desired light exiting modulation in stable condition can be obtained.

In accordance with the electro optical modulation system having said structure for said operation, it is unnecessary to equip expensive parts such as the beam splitter and the optical detector at the inlet side of the optical modulator (3), to decrease the cost and it is also unnecessary to arrange the optical axis of the optical modulator (3) and the axes of these parts to adjust easily the parts. These effects are especially significant for the system in which the level of the light signal is often varied.

In the above-mentioned embodiment, the reference voltage B of the voltage comparator (20) is set to be zero so as to give the duty ratio of the ouput e of 50% in the normal bias. When the modulated light output having distorted waveform is desired, the bias control can be performed at the position drifting the bias point from the normal bias point by varying the reference voltage B of the reference power source.

In accordance with the electro optical modulation system of the present invention, the difference between (1) the mean value signal of the output of the voltage comparator for comparing the modulated light intensity signal with the reference voltage and (2) the mean value signal of the inversion output of the voltage comparator is applied as the bias to the light modulator, whereby the functions of the conventional system can be given though the beam splitter and the optical detector can be minimized so as to be low cost and also the arrangement for axes of these parts is not required to be simply adjusted. These are significant advantages.

We claim:

1. An electro optical modulation system which comprises a voltage comparator for comparing a modulated light intensity signal as an output of an optical modulator with a reference voltage so as to output two voltage signals;
an inversion circuit for inverting the output of said voltage comparator;
a first mean value circuit for the mean value of the output of said voltage comparator;
a second mean value circuit for the mean value of the output of said inversion circuit;
a differential amplifier for receiving the outputs of said first and second mean value circuits respectively as the first and second inputs; and
a bias amplifier for feeding the output of said differential amplifier into said optical modulator.

2. An electro optical modulation system according to claim 1 wherein said optical modulator utilizes electro optical effect of a crystal.

* * * * *